(12) United States Patent
Scott, Jr.

(10) Patent No.: US 6,401,746 B1
(45) Date of Patent: Jun. 11, 2002

(54) ROTATING UNION FOR FLUIDS, SEMI-FLUIDS, GASEOUS FLUIDS AND OTHER MATERIALS

(76) Inventor: Grant E. Scott, Jr., 1316 Mountain View, Olean, NY (US) 14760

( * ) Notice: Subject to any disclaimer, the term of this patent is extended or adjusted under 35 U.S.C. 154(b) by 13 days.

(21) Appl. No.: 09/696,643

(22) Filed: Oct. 25, 2000

(51) Int. Cl.$^7$ ................................................ F16L 39/04
(52) U.S. Cl. ...................... 137/312; 137/240; 137/580; 285/13; 285/121.3; 285/121.6
(58) Field of Search ................................. 137/240, 312, 137/334, 580, 581; 277/318, 320, 928; 285/11, 13, 121.1, 121.3, 121.5, 121.6, 272

(56) References Cited

U.S. PATENT DOCUMENTS

| | | | | |
|---|---|---|---|---|
| 1,574,211 A | * | 2/1926 | Taylor | 285/13 |
| 2,345,019 A | * | 3/1944 | Van Alstyne | 285/11 |
| 2,384,281 A | * | 9/1945 | Carter | 285/13 |
| 2,425,211 A | * | 8/1947 | Strickland, Jr. | 285/121.1 |
| 2,450,895 A | * | 10/1948 | Keim | 285/121.3 |
| 2,460,872 A | * | 2/1949 | Carpenter | 285/121.5 |
| 2,701,146 A | * | 2/1955 | Warren | 285/121.1 |
| 3,017,202 A | * | 1/1962 | Swaney | 285/121.3 |
| 4,606,560 A | * | 8/1986 | McCracken | 285/121.1 |
| 4,635,969 A | * | 1/1987 | Jackson | 285/121.1 |
| 4,817,995 A | | 4/1989 | Deubler et al. | 285/98 |
| 4,928,997 A | * | 5/1990 | Reisner et al. | 285/13 |
| 4,934,744 A | * | 6/1990 | Samera et al. | 285/121.3 |
| 5,044,673 A | * | 9/1991 | Jones, Jr. | 285/121.3 |
| 5,065,792 A | * | 11/1991 | Ohta et al. | 137/581 |
| 5,110,159 A | * | 5/1992 | Herold et al. | 285/121.3 |

OTHER PUBLICATIONS

Deublin advertising brochure for General purpose 55 Series Unions; pp. 6 & 7.

* cited by examiner

*Primary Examiner*—George L. Walton
(74) *Attorney, Agent, or Firm*—Walter W. Duft (57) ABSTRACT

A rotating union for transferring a material stream, and especially a bearing damaging material stream, includes, a generally cylindrical body and an annular sleeve that is annularly spaced from the body and rotatably coupled thereto via a pair of axially-spaced bearings. The body and the sleeve are formed with ports and interconnecting passages for carrying the material stream and these ports and passages communicate with each other via a material transfer interface that is sealed by at least one dynamic seal assembly. Finely lapped material is used to improve the quality of the dynamic seal faces, and the seal faces are uniformly spring loaded. This, along with the axial spacing of the bearings, helps to minimize seal face misalignment and consequent leakage. In the event that material leakage does occur, the rotating union further includes a leakage collection area filled with a barrier fluid. The leakage collection area may encompass the bearings or it may be separate therefrom. A barrier fluid circulation system removes barrier fluid from the leakage collection area along with any material that leaks past the dynamic seals. The barrier fluid circulation system may be passive or active.

20 Claims, 8 Drawing Sheets

ROTATING UNION FOR FLUIDS, SEMI-FLUIDS, GASEOUS FLUIDS AND OTHER MATERIALS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

This invention relates generally to rotating unions for transferring material streams between stationary and rotating material-carrying equipment. More specifically, the invention concerns rotating unions for handling bearing damaging fluids and semi-fluids, gaseous fluids having poor heat dissipation characteristics, environmentally sensitive compositions, and other materials wherein internal material leakage is an important concern.

A rotating union is used to transfer a material stream between a material provider and a material recipient that must rotate relative to each other. Typically, the material provider, such as an inlet conduit leading from a material source, is stationary while the material recipient, such as an outlet conduit leading to fluid processing equipment, rotates relative to the material provider. In other implementations, the material provider rotates relative to a stationary material recipient.

In either case, material to be transferred is directed through a material stream passage formed in a first rotating union member, across a dynamically sealed material transfer interface, to a material stream passage formed in a second rotating union member that is rotatably coupled to the first rotating union member via a bearing system. Dynamic sealing is provided by a dynamic seal assembly that mounts to the first and second rotating union members. The seal assembly has dynamic seal faces that are spring-biased into mutual rotational engagement to contain the transferred material as it passes between the first and second rotating union members.

Some rotating union applications call for the transfer of bearing damaging (e.g., abrasive) fluids and semi-fluids, gaseous fluids having poor heat dissipation characteristics, environmentally sensitive compositions, and other materials into or out of processing equipment. Such materials include, by way of example only, paint (having a ratio of 70% or more solids to 30% or less solvents), glue (hot and cold), rubber, and any of a variety of plastics or other polymers, such as sealants.

In certain rotating unions of the prior art, the handling of such materials has been problematic. For example, when bearing damaging material has been transferred, it has tended to leak past the dynamic seal and contact the bearings, ultimately degrading or damaging them. This condition is believed to be attributable to a variety of factors, including (1) misalignment of the dynamic seal faces causing them to intermittently separate during rotation, (2) unequal spring loading on the dynamic seal faces so as to aggravate the effects of seal misalignment, and (3) the selection of dynamic seal face materials that lack sufficient hardness. In addition, none of the rotating unions of the prior art, as far as known, have sought to affirmatively remove heat when transferring gaseous fluids having poor heat dissipation characteristics. There are also no known rotating unions that remove leakage material from the vicinity of the bearings once it does leak past the dynamic seal. One prior art approach has utilized drainage holes to remove leakage material; however, this is a passive approach to material removal, and does not affirmatively work to prevent the material from contacting the bearings.

It is with overcoming the foregoing deficiencies of the prior art that the present invention is concerned.

BRIEF SUMMARY OF THE INVENTION

It is an object of the present invention to provide an improved rotating union for use with bearing damaging fluids and semi-fluids, gaseous fluids having poor heat dissipation characteristics, environmentally sensitive compositions, and other materials, that greatly reduces the likelihood that material will leak past the dynamic seal faces and into the bearing area of the rotating union. A further object of the invention is to provide an improved rotating union that employs a system for affirmatively removing material that does leak past the dynamic seal faces and into the vicinity of the bearings.

To that end, a rotating union is provided that comprises two separate circulating systems. One circulating system is a primary system for transferring a material stream through the union from a material provider to a material recipient arranged for mutual relative rotation. The other circulating system is a secondary system for circulating a barrier fluid past the dynamic seal(s) of the union and carrying leakage material from the primary system away from the dynamic seal(s).

In a first preferred embodiment, the rotating union of the invention includes a generally cylindrical body and a generally annular sleeve that is radially spaced from the body and rotatably coupled thereto via a pair of axially-spaced bearings. The body and the sleeve are formed with ports and interconnecting passages for transferring a material stream therethrough and these ports and passages communicate with each other via a material transfer interface that is dynamically sealed by a dynamic seal assembly. A very finely lapped (preferably ceramic) material is used for the seal faces and the seal faces are finished square to the axial centerline of the rotating union to provide correct, tight, lapped sealing surfaces. The wide spacing of the bearings and uniform spring loading of the dynamic seal faces minimizes seal face misalignment, thus further minimizing the possibility of material leakage across the dynamic seal assembly. In the event that material leakage does occur, the rotating union further includes a leakage collection area on the opposite side of the dynamic seal assembly. The leakage collection area is charged with a barrier fluid and is sealed so that the barrier fluid cannot contact the bearings. A passive barrier fluid circulating system is provided for removing barrier fluid from the leakage collection area along with material that leaks past the dynamic seal faces. The barrier fluid circulating system includes a barrier fluid reservoir that surrounds the sleeve and passages through which barrier fluid is circulated from the leakage collection area under the rotating action of the body.

In a second preferred embodiment, the rotating union of the invention includes a generally cylindrical body and a generally annular sleeve that is radially spaced from the body and rotatably coupled thereto via a pair of axially-spaced bearings. As with the first preferred embodiment, the body and the sleeve are formed with ports and interconnecting passages for transferring a material stream therethrough and these ports and passages communicate with each other via a material transfer interface that is dynamically sealed. Again, the seal faces are made from finely lapped (preferably ceramic) material and they are uniformly spring loaded to minimize seal misalignment. Unlike the first preferred embodiment, a pair of dynamic seal assemblies are provided, and they are positioned between the bearings such that seal rocking becomes nearly impossible. The second preferred embodiment also includes a pair of leakage collection areas located between the dynamic seal assemblies and the bearings. To prevent bearing damaging material from contacting the bearings, the leakage collection areas are charged with a barrier fluid and an active barrier fluid circulating system is provided for pumping barrier fluid through the bearings themselves and toward the dynamic seal assemblies. The barrier fluid is then removed from the leakage collection areas along with bearing damaging material that leaks past the dynamic seal faces.

BRIEF DESCRIPTION OF THE SEVERAL VIEWS OF THE DRAWING

The various aspects of the present invention will be more fully understood when the following portions of the specification are read in conjunction with the accompanying drawing wherein.

DETAILED DESCRIPTION OF THE INVENTION

Figure 1:
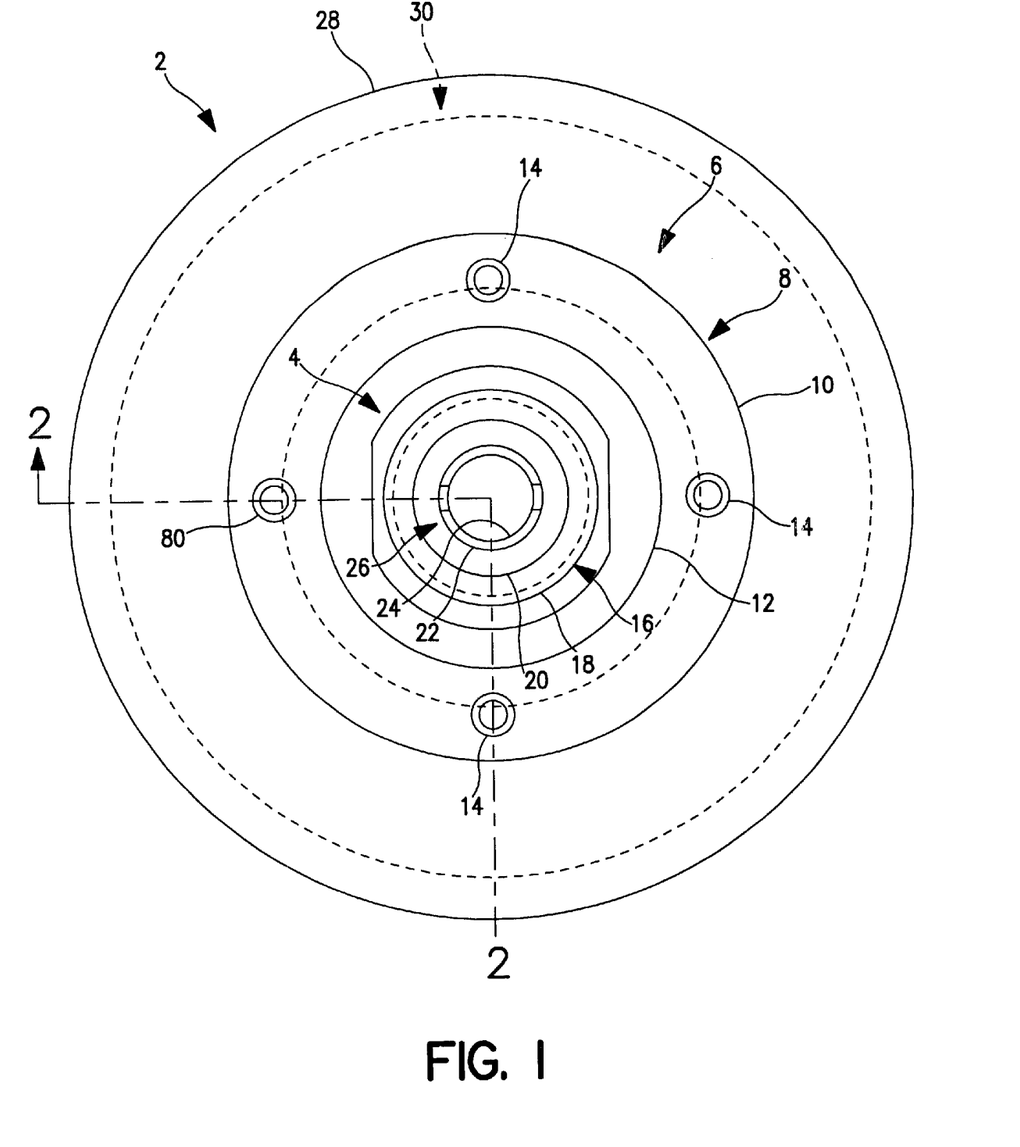
FIG. 1 is a bottom view of a rotating union constructed in accordance with a first preferred embodiment of the present invention.
Figure 2:
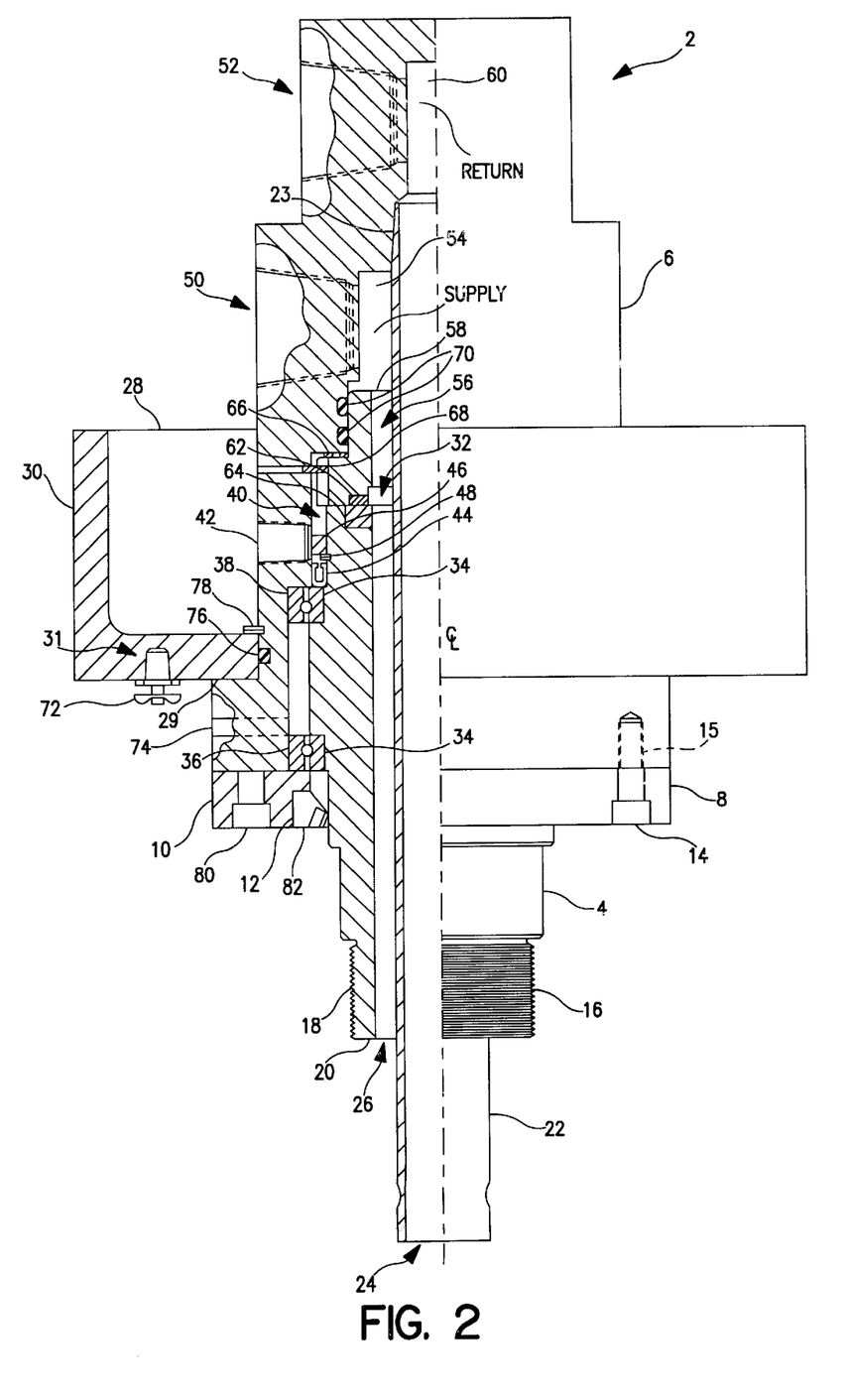
FIG. 2 is a side elevational view of the rotating union of FIG. 1 with a section removed along line 2—2 in FIG. 1.

Turning now to the drawing, wherein like reference numerals designate like elements in all of the several views, FIG. 1 illustrates a bottom view of a rotating union 2 for transferring a material stream from a material provider (not shown) to a material recipient (not shown) arranged for mutual relative rotation. FIG. 2 illustrates a side elevation view of the rotating union 2 with a section removed to show interior components. Unless otherwise indicated, all of the structural members of the rotating union 2 described hereinafter are made of a suitable metal, such as aluminum, steel or stainless steel, depending on the application. The rotating union 2 includes a generally cylindrical body 4 and a generally annular sleeve 6 arranged to surround the body 4 in radially spaced relationship therewith over a portion of the body's axial length. In particular, the sleeve 6 covers the upper end of the body 4 while leaving the lower end exposed. A cap ring 8 is mounted to the bottom of the sleeve 6, and includes outside and inside walls respectively shown by reference numerals 10 and 12. The cap ring 8 is attached to the sleeve 6 by plural bolts (not shown) that are received in respective countersunk holes 14 formed in the cap ring and mating holes 15 formed in the sleeve.

The lower end of the body 4 is threaded as shown by reference numeral 16 and adapted for attachment to a material recipient (not shown). The threaded portion 16 includes a threaded outside wall 18 and a smooth inside wall 20. It will be seen in FIG. 2 that the inside wall 20 continues throughout the length of the body 4, thus defining an interior bore of constant diameter. A circulation tube or pipe 22 extends coaxially within this bore, in spaced relationship with the inside wall 20. The pipe 22 connects at its upper end to the sleeve 6, as shown at reference numeral 23. As described in more detail below, the interior of the pipe 22 provides a circulation return passage 24 for a material stream returning from the material recipient. The annular space formed between the pipe 22 and the inside wall 20 of the body 4 provides a supply passage 26 for delivering a material stream to the material recipient.

A barrier fluid cup 28 is seated on a shoulder 29 that is formed on an upper portion of the sleeve 6. The cup 29 surrounds the sleeve 6 in coaxial relationship therewith. It has an upwardly extending annular side wall 30 and a flat bottom wall 31, such that the cup 29 forms a pond or reservoir for holding a barrier fluid, as described in more detail below. In this configuration, the rotating union 2 is best suited for an operational setup wherein the sleeve 6 remains stationary, while the body 4 rotates relative thereto. However, the body 4 could remain stationary while the sleeve 6 rotates, if there was reason to do so.

With particular reference now to FIG. 2, the body 4 extends upwardly from the threaded portion 16 to a material transfer interface 32 located at the top of the supply passage 26 and representing the area where material is transferred from the sleeve 6 to the body 4, as described in more detail below. As previously indicated, the interior of the body 4 has a smooth wall 20 providing a constant diameter bore. The outside of the body 4 has several outer wall sections of different diameter, beginning with the threaded outside wall 18 of the threaded portion 16. These outer wall sections include a pair of upper and lower bearing seats 34 that mount respective first and second bearings 36 and 38. The bearings 36 and 38 are conventional in nature and provide a rotational interconnection or coupling between the body 4 and the sleeve 6. The bearings 36 and 38 are mounted so as to be relatively widely spaced from each other. This wide spacing helps minimize dynamic seal misalignment by maintaining the body 4 and the sleeve 6 in relatively non-rocking rotational alignment.

A generally annular leakage collection area 40 is provided between the uppermost portion of the body 4 and a medial portion of the sleeve 6, above the second bearing 38. The leakage collection area 40 is in fluid communication with the fluid reservoir formed by the cup 28 via a pair of radially extending ports 42 (only one is shown). The ports 42 are preferably spaced 180 degrees from each other. A suitable viscous, cooling, lubricating barrier fluid, such as mineral oil, is carried in the reservoir formed by the cup 28. The barrier fluid is free to flow between the cup 28 and the leakage collection area 40 via the ports 42. At the bottom of the leakage collection area 40 is a U-shaped cup seal 44. The cup seal 44 is of conventional design, and made from a suitable material such as PTFE (Polytetraflouroethylene). An optional impeller 46 is mounted above the cup seal 44. It is preferably press-fit onto the body 4, and may be further supported by a spring clip 48. The purpose of the impeller 46 is to pump material that enters the leakage collection area 40 (and becomes suspended in the barrier fluid) through one of the ports 42 (the other port 42 being a return port, as described below) and into the reservoir provided by the cup 28. Once in the cup 28, the material (still carried in suspension by the barrier fluid) will gravitate to the bottom of the cup 28 where it can be safely removed. In this way, the material is prevented from coagulating and is carried away from the area where the bearings 36 and 38 are located.

A first material stream supply port 50 is formed in the sleeve 6 and receives material from a material provider (not shown) that will typically remain stationary during material transfer operations. An inlet conduit leading from a material source reservoir is one example of a material provider that could be connected to the supply port 50. A second material stream return port 52 is formed in the sleeve 6 and is adapted for connection to a material return, which could be a return conduit that leads back to a material source reservoir, thus returning material back to the material source. This allows the material to be circulated for remixing, which is useful for slurries and other mixtures containing particulates that need to remain in suspension in a fluid medium.

The material that enters the rotating union 2 through the supply port 50 is carried into an annular receiving area 54 formed between the sleeve 6 and the pipe 22. From there, the material travels through an annular passage 56 formed between the pipe 22 and an interior wall of an annular dynamic chair seal element 58. At this point, the material enters the area of the material transfer interface 32, which may be thought of as including the lower part of the annular passage 56 and the upper part of the supply passage 26. The material then traverses the supply passage 26 and exits the rotating union 2 through the bottom of the body 4. Material returning from the material recipient enters the rotating union 2 via the return passage 24 and is carried through the pipe 22 to a material return area 60 in fluid communication with the return port 52.

The dynamic chair seal element 58 forms a dynamic seal with the upper end 36 of the body 4 to retain material in the material transfer interface 32 as the material transfers from the sleeve 6 to the body 4. A pair of very finely lapped ceramic inserts 62 and 64 are respectively formed in the chair seal element 58 and the upper end of the body 4, and provide the mating dynamic seal faces. These surfaces are preferably formed by respectively making a slight undercut in the chair seal member 58 and the upper end of the body 4 and applying (as by bonding or spraying) a ceramic coating to fill each undercut. The ceramic material is then lapped to form an extremely smooth, hard surface. Lapping is preferably performed using a silicon carbide lapping tool to less than about 1 micron roughness. Alternatively, ceramic-on-ceramic lapping could be performed. Thus configured, the dynamic seal faces provide a superior dynamic seal that can withstand many hours of operation in an abrasive fluid environment without significant leakage. In a modified configuration, the chair seal element 58 could be manufactured as a one-piece ceramic casting which is then finish ground and lapped in the manner described above.

One or more washer-type springs 66 are used to exert a sealing force on the chair seal element 58. Advantageously, the spring 66 exerts a uniform spring force on the chair seal element 58 due to its multiple contact points around 360 degrees of diameter therewith, thus minimizing eccentric loading of the chair seal element 58 and the attendant leakage of material across the dynamic seal faces. Alternatively, multiple coil springs (not shown) could be located around the periphery of the chair seal element 58 to provide an equally uniform spring force. The wide axial spacing of the bearings 36 and 38 likewise minimizes dynamic seal rocking and attendant seal misalignment. A pair of locking pins 68 located 180 degrees apart (only one is shown) are used to stabilize the chair seal element 58 against rotation. A pair of conventional static seals 70 made from rubber or similar flexible material are seated in grooves on the sleeve 6 to engage the chair seal element 58, thus sealing against leakage of the barrier fluid from out of the upper end of the leakage collection area 40.

During operation of the rotating union 2, the barrier fluid is held in the reservoir defined by the cup 28. A cover (not shown) is secured over the top of the cup wall 30. In some cases, the reservoir can be 'sealed (enclosed) and the barrier fluid can be pressurized, particularly where the barrier fluid is water, under a pressure. This pressure may even be raised to the point where barrier fluid is forced across the dynamic seal faces and into the material transfer interface 32, thus cooling and lubricating the seal faces, and assisting the dynamic seal in sealing the material inside the material transfer interface 32.

The barrier fluid is passively circulated by rotary motion of the body 4 relative to the sleeve 6 during operation, which creates a pumping action (assisted by the impeller 46, if present) from the leakage collection area 40 to the cup 28. Note that the impeller 46 is radially aligned with the centerline of the port 42 illustrated in FIG. 2. This allows free movement of the impelled material from the leakage collection area 40 to the cup 28. Although not shown, the other port 42 is positioned higher on the sleeve 6 than the illustrated port 42, such that it is above the impeller 46. This higher port 42 serves as a return passage for barrier fluid returning to the leakage collection area, thus facilitating a circulating flow of barrier fluid.

Advantageously, in the event that any material leaks out of the material transfer interface 32 past the dynamic seal faces, it will enter the leakage collection area 40 and become suspended in the barrier fluid, which is selected according to the type of material being carried through the rotating union 2. As this suspended material circulates into the cup 28, it will tend to gravitate to the bottom of the cup 28 while clean barrier fluid enters the leakage collection area 40 from the upper portion of the cup 28 through the upper port 42. In the event that the barrier fluid becomes contaminated with too much material, the cup 28 can be drained via a drain plug 72 and refilled with clean barrier fluid.

To maintain the bearings 36 and 38 in serviceable condition, a grease fitting inlet 74 is provided in the side of the sleeve 6. To prevent leakage of barrier fluid from the cup 28, a static seal 76 engages the portion of the cup's bottom wall 31 through which the sleeve 6 extends. To help retain the cup 28 in position, a snap ring 78 is mounted on the sleeve 6 to engage the bottom wall 31. If necessary, a torque arm (not shown) may be bolted to stabilize the body 6 using a countersunk bolt hole 80 formed in the cap ring 8. A static seal 82 of conventional design is placed between the cap ring's inside wall 12 and the body 4 to seal the bearings 36 and 38 against dust and dirt.

As previously indicated, the rotating union 2 may carry many different types of bearing damaging material, or it may carry other material that is not necessarily bearing damaging, but which should not leak into the outside environment in any event. The barrier fluid is indicated by way of example above as being mineral oil. This type of barrier fluid can be used when the rotating union 2 carries organic solvent-based materials. For water-based materials, a water-based barrier fluid can be used, although it may need to be treated, as with a soap solution or the like, to reduce shear-sensitivity. For food processing applications, mineral oil is preferred as the barrier fluid because it complies with FDA requirements. For non-consumable material applications, other fluids such as lubricating oils, hydraulic oils, water-based fluids, water, and even gasses, are all feasible barrier fluids that could be used with the present invention.

Figure 3:
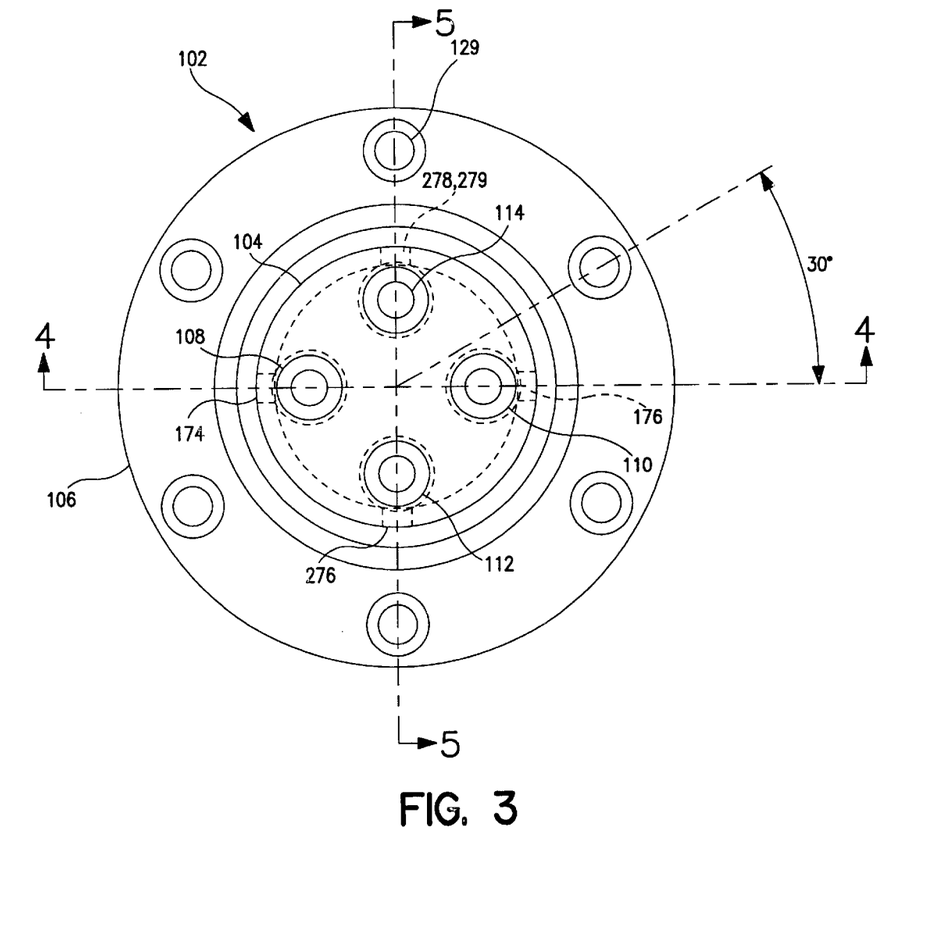
FIG. 3 is an end view of a rotating union constructed in accordance with a second preferred embodiment the present invention.

Having now disclosed a first preferred embodiment of the invention, a second preferred embodiment will next be described with initial reference being made to FIG. 3. FIG. 3 is an end view showing a rotating union 102 for transferring a material stream from a material provider (not shown) to a material recipient (not shown) arranged for mutual relative rotation. Unless otherwise indicated, all of the structural members of the rotating union 102 described hereinafter are made of a suitable metal, such as aluminum, steel or stainless steel, depending on the application. The rotating union 102 includes a generally cylindrical body 104 and a generally annular sleeve 106 arranged to surround the body 104 in radially spaced relationship over a portion of the body's axial length, and to cover one end of the body while leaving the other end, i.e., the end which is shown in FIG. 3, exposed. Four axially-oriented ports 108, 110, 112 and 114 (axial ports) are formed at the exposed end of the body 102 and serve several functions as described in more detail hereinafter.

Figure 4:
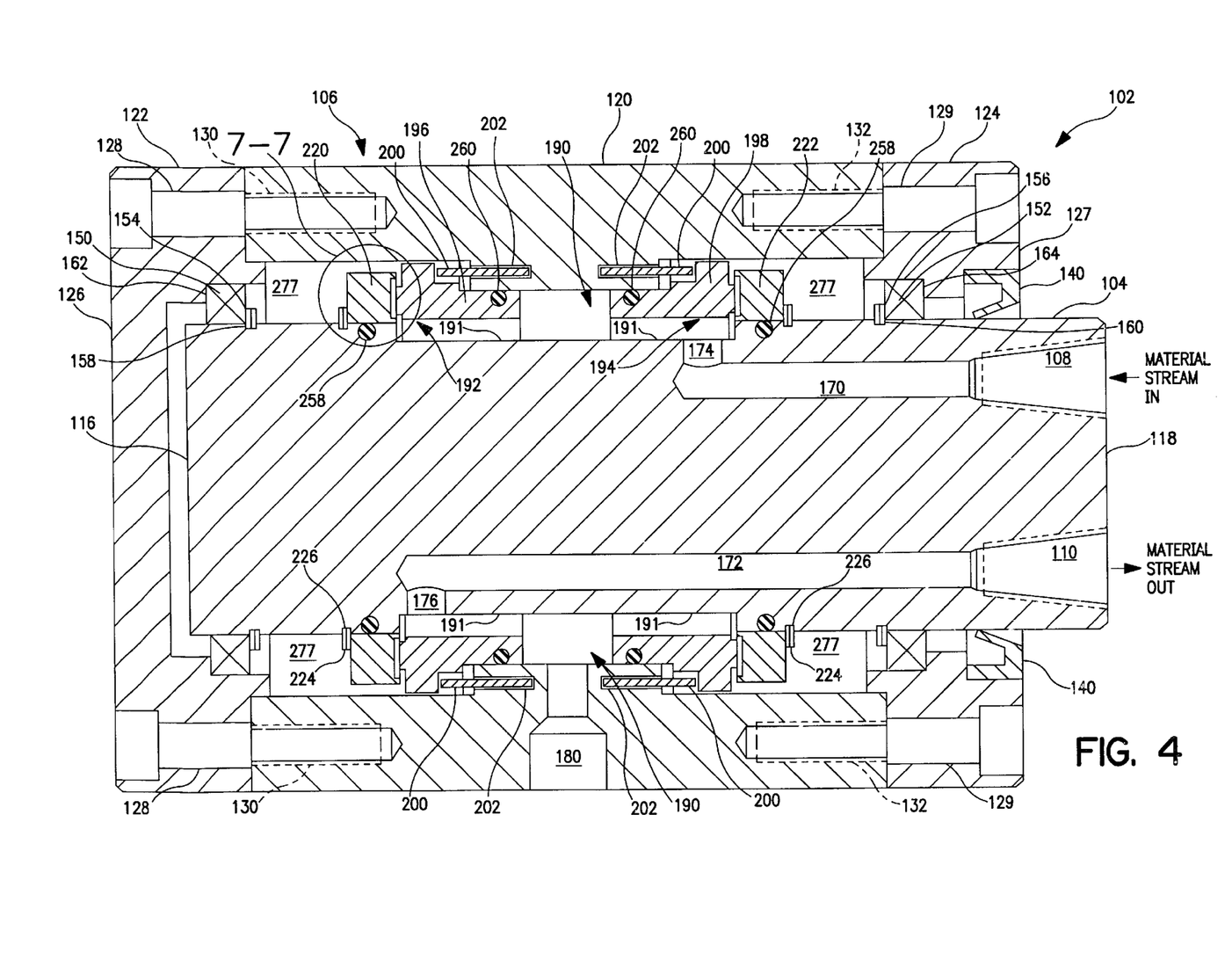
FIG. 4 is a cross-sectional view of the rotating union of FIG. 3 taken along line 4—4 in FIG. 3 to show a primary circulation system for circulating fresh material through the union from a material provider to a material recipient, and for recycling unused material from the material recipient back to the material provider.

Turning now to FIG. 4, the body 104 is seen as having a first covered base end 116 and a second exposed face end 118 in which the axial ports 108, 110, 112 and 114 are formed. To help facilitate assembly of the rotating union 102, the sleeve 106 is preferably implemented as a multi-part assembly. FIG. 4 illustrates a preferred embodiment wherein the sleeve 106 is configured as a three-part assembly comprising a central sleeve member 120 and two end caps 122 and 124. The end cap 122 defines a first closed end 126 of the sleeve 106 that is proximate to, and covers, the base end 116 of the body 104. The end cap 124 defines a second open end 127 of the sleeve 6 that is proximate, but not necessarily adjacent, the face end 118 of the body 104. It will be appreciated that the multi-part sleeve configuration of FIG. 4 greatly simplifies the construction of the rotating union 102.

The end caps 122 and 124 are attached to the central sleeve member 120 using a plurality of bolts (not shown). These bolts are received through countersunk bolt holes 128 and 129 that are formed in the end caps 122 and 124, respectively. The bolts are then secured in threaded holes 130 and 132 that are formed in the central sleeve member 120 in alignment with the bolt holes 126 and 127, respectively. As can be seen in FIG. 3, the bolt holes 129 (and the same holds true for bolt holes 128) are arranged in a spaced pattern around the circumferential face of the end cap open end 127. In the embodiment of FIG. 3, there are 6 bolt holes 129 (and 128) spaced 30 degrees apart. Other bolt patterns could also be used.

A generally annular gap is maintained between the body 104 and the sleeve 120. This gap is covered at the open end 127 of the sleeve 106 by an annular lip seal 140 of conventional design, made from rubber or the like. First and second bearings 150 and 152 are disposed in the aforementioned gap and provide a rotational interconnection or coupling between the body 104 and the sleeve 106. The bearings 150 and 152 are mounted near the respective ends 126 and 127 of the sleeve 106 so as to be widely axially spaced from each other. As described in more detail below, this wide spacing helps minimize dynamic seal misalignment by maintaining the body 4 and the sleeve 106 in concentric non-rocking rotational alignment. Snap rings 154 and 156 secure one side of each bearing 150 and 152 against axial movement, respectively. More specifically, the snap rings 154 and 156 engage the sides of the inner bearing face of each bearing 150 and 152. The snap rings 154 and 156 are seated in respective annular grooves 158 and 160 formed in the radial outer surface of the body 104. The opposite sides of the bearings 150 and 152, and more specifically, the sides of the outer bearing races, abut against annular shoulders 162 and 164 formed on the end caps 122 and 124 of the sleeve 106, respectively.

A first material stream passage 170, and an optional second material stream passage 172 (body passages), are formed in the body 104 to carry a material stream through the body 104 for ultimate delivery to the sleeve 106. The body passage 170 extends axially in the body 104 between the axial port 108 and a first radially-oriented port 174 (radial port) located at the radial exterior surface of the body 104. The optional body passage 172 extends axially in the body 104 between the axial port 110 and a second radially-oriented port 176 (radial port) located at the radial exterior surface of the body 104. As can be seen more clearly in FIG. 3., the radial ports 174 and 176 are oriented 180 degrees apart from each other when viewing the rotating union 102 from the face end 118 of the body 104.

The axial port 108 serves as a material stream inlet port to the rotating union 102 and is adapted for connection to a material provider (not shown) that typically, but not always, remains stationary during material transfer operations. An inlet conduit leading from a material source reservoir is one example of a material provider that could be connected to the axial port 108. The axial port 108 acts in combination with the body passage 170 and the radial port 174 to provide a material stream delivery path for delivering a material stream for transfer to the sleeve 106. The axial port 110 is adapted for connection to a material return, which could be a return conduit that leads back to a material source reservoir. The axial port 110 acts in combination with the body passage 172 and the second radial body port 176 to provide a material stream return path for returning portions of the material stream that are not transferred to the sleeve 106, or which return from a material recipient (see below), back to the material provider.

A radially-oriented material stream port 180 (radial port) is formed in the sleeve 106. The radial port 180 is spaced from the radial port 174 on the body 104 in an axially offset relationship, and is adapted to receive material that is provided by the radial port 174. The radial port 180 serves as a material stream outlet port from the rotating union 102, and is adapted to be connected to a material recipient that typically, but not always, rotates relative to a stationary material provider. It will be appreciated that an axial material stream outlet port could be provided as an alternative to the radial port 180.

An annular material transfer interface 190 is provided to transfer a material stream from the radial port 174 of the body 104 to the radial port 180 of the sleeve 106. The material transfer interface 190 thus extends between the radial ports 174 and 182 so as to facilitate material transfer therethrough in a radial, and if desired, axial direction. The material transfer interface 190 is defined in part by an annular slot 191 formed in the radial outer surface of the body 104, and is bounded by a pair of axially-spaced dynamic seal assemblies 192 and 194 (primary seal assemblies) that are centrally located between the bearings 150 and 152, and adjacent to the ends of the slot 191.

The primary seal assemblies 192 and 194 each include a generally annular chair seal member, respectively labelled by reference numerals 196 and 198 in FIG. 4. The chair seal members 196 and 198 are mounted in axially slidable, rotationally fixed engagement with the sleeve 106. The non-rotational connection between each chair seal member 196/198 and the sleeve 106 is provided by a pair of axially oriented anti-rotation pins 200 that are press fit into holes 202 formed in the sleeve 106, and which extend into notches 204 formed in the chair members 196 and 198 (see FIGS. 6 and 7). The axial slidable coupling between each chair seal member 196/198 and the sleeve 106 is provided by a circumferential arrangement of springs 206 (see FIG. 5) that axially bias the chair seal members 196 and 198 toward the respective ends 116 and 118 of the body 104. One end of each spring 206 is received in one of a plurality of holes 208 (see FIG. 6) formed in a circumferential pattern in the chair seal members 196 and 198. The other end of each spring 206 engages the side of a central shoulder flange 210 (see FIG. 5) disposed on the inner radial surface of the sleeve 106 at a central location between the closed and open sleeve ends 126 and 127.

Figure 7:
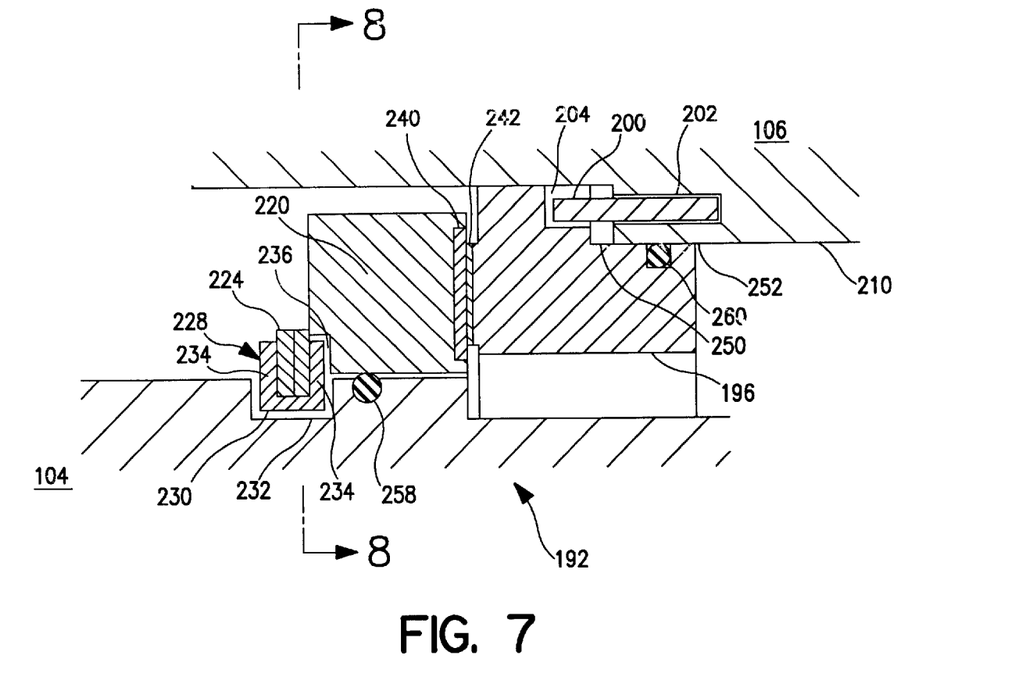
FIG. 7 is an enlargement of inset view 7—7 in FIG. 4 showing a pin arrangement for connecting the dynamic chair seal member to a sleeve member of the rotating union of FIG. 3 to prevent relative rotation between the chair seal member and the sleeve.
Figure 8:
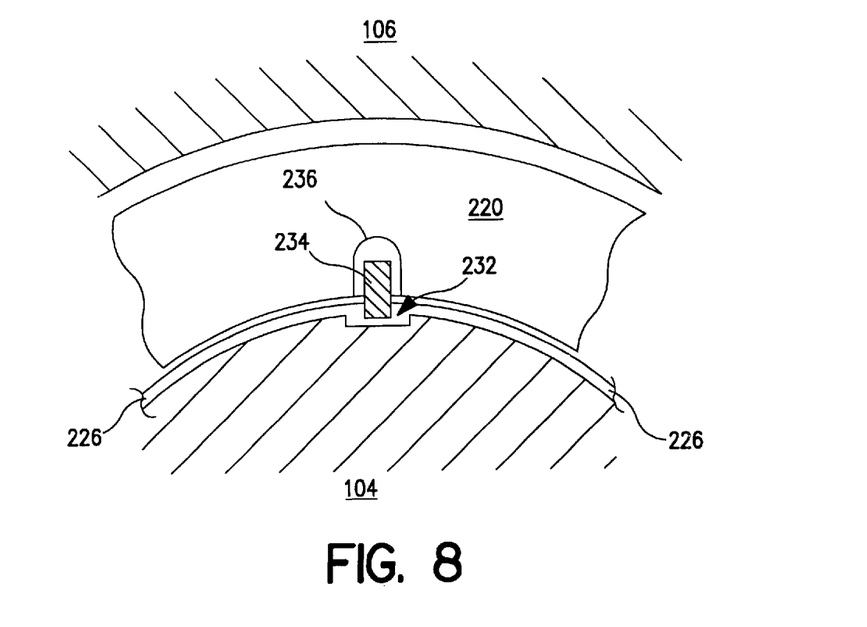
FIG. 8 is an enlarged cross-sectional view taken along line 8—8 in FIG. 7 showing a clip for securing a body ring seal member against rotation relative to a body member of the rotating union.

The primary seal assemblies 192 and 194 each further include a generally annular body ring seal member 220 and 222, respectively. As shown more clearly in FIGS. 7 and 8, each body ring seal member 220 and 222 is mounted in fixed axial and rotational engagement with the body 104 using a snap ring 224 that seats in a circumferential slot 226 (see FIG. 8) formed in the radial outer surface of the body 104, and a pair of U-shaped clips (U-clips) 228 (only one is shown). The U-clips 228 are spaced 180 degrees apart when viewing the rotating union 102 from the face end 118 of the body 104, as in FIG. 3. Each U-clip 228 has an axially oriented base 230 that is trapped underneath the snap ring 224 in a corresponding well 232 formed in the body 104 as an enlargement of the slot 226 that seats the snap ring 224. The U-clips 228 further include radially oriented legs, one of which fits into a corresponding notch 236 formed in one side of each of the body ring seal members 220 and 222, namely, the side that does not engage a chair seal member 196/198.

Where the chair seal members 196/198 and the body ring seal members 220/222 engage each other, i.e., to form the dynamic sealing surfaces, the seal members 196/98 and 220/222 each have very finely lapped ceramic seal faces 240 and 242, as shown in FIG. 7. As in the first preferred embodiment, these surfaces are preferably formed by making a slight undercut in one side of the seal members 196/198 and 220/222, and applying a ceramic coating to fill the undercut. The ceramic material is then lapped in the manner described relative to the first preferred embodiment to form an extremely smooth surface that is preferably less than about 1 micron roughness.

Further assisting the effectiveness of the dynamic seal are the plural springs 206, which provide 360 degrees of uniformly distributed biasing force on the chair seal members 196 and 198, to urge them into sealing engagement with the body ring seal members 220 and 222. The chair seal members 196 and 198 are also able to maintain precise alignment as they engage the body ring seal members 220 and 222 because a slight gap, e.g., about 0.005 inches, is maintained to provide a clearance fit between an outer radial surface of each chair seal members 196 and 198, and a mating surface of the sleeve 106 that each chair seal members 196 and 198 slidably engages. In particular, as shown in FIG. 7, this slidable engagement occurs between a chair seal member surface 250 and a corresponding sleeve surface 252. The surface 252 represents part of the central shoulder flange 210.

The small gap between the slidably engaging surfaces of the chair seal members 196 and 198 and the sleeve 106 permit the chair seal members 196 and 198 to float slightly. This allows the chair seal members 196 and 198 to adjust to any eccentricities in the alignment of the body ring seal members 220 and 222 that arise due to twisting of the U-clips 228 as they rotatably couple the body ring seal members 220 and 222 to the body 104. If the body ring seal members 220 and 222 become eccentrically aligned, the chair seal members 196 and 198 will self-align to the body ring seal member eccentricity. The seal faces 240 and 242 will thus remain in mutual parallel contact with each other. A pair of conventional static O-ring seals 258 and 260, made from rubber or the like, are further provided to minimize material leakage past the primary seal assemblies 192 and 194.

Figure 5:
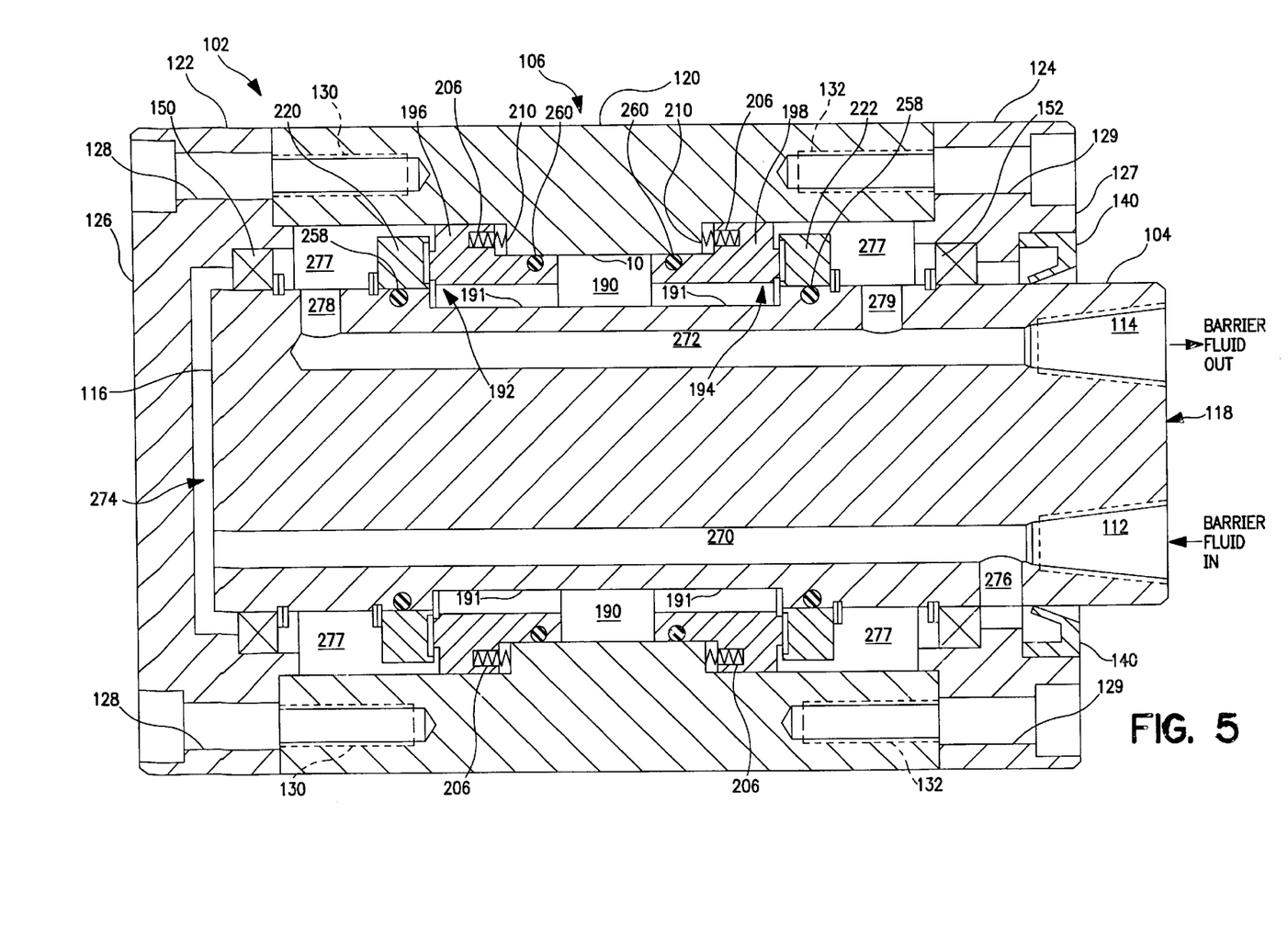
FIG. 5 is a cross-sectional view of the rotating union of FIG. 3 taken along line 5—5 in FIG. 3 to show a secondary circulation system for circulating a barrier fluid past the dynamic seals of the union to pick up any material that leaks from the primary circulation system.
Figure 6:
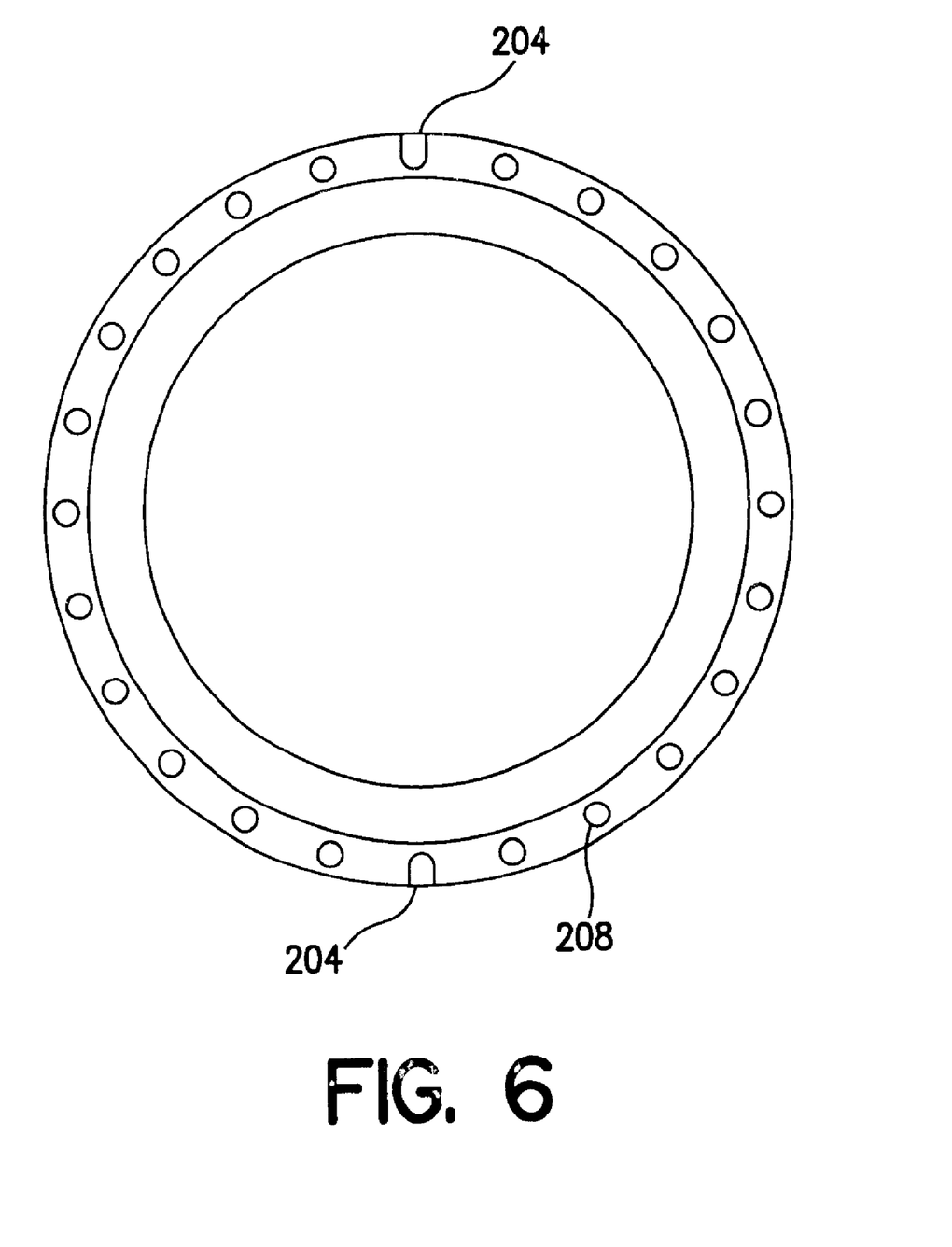
FIG. 6 is an end view of a dynamic chair seal member used in the rotating union of FIG. 3 showing a plurality of spring-receiving holes therein.

Turning now to FIG. 5, a barrier fluid system is provided to further limit the damaging effect on the bearings of material leakage past the primary seal assemblies 192 and 194. This is done by affirmatively working to prevent material that does leak past the dynamic seal assemblies 192 and 194 from reaching the bearings 150 and 152. To that end, a pair of axial barrier fluid passages 270 and 272 are formed in the body 104. The axial passage 270 is a barrier fluid supply passage that extends between the axial port 112 formed at the face end 118 of the body 104, which acts as a barrier fluid inlet port, and a pair of barrier fluid injection ports 274 and 276 (injection ports). It will be seen that, unlike the various other ports of the rotating union 102, the injection port 274 is formed by the disk-shaped gap that exists between the base end 116 of the body 104 and the central inside surface of the end cap 122 of the sleeve 106. Collectively, the axial port 112, the axial passage 270 and the injection ports 274 and 276 provide a barrier fluid injection path within the rotating union 102. More specifically, barrier fluid introduced to the axial port 112 is fed through the axial passage 270 to the injection ports 274 and 276. The injection ports 274 and 276 are positioned to communicate with a pair of leakage collection areas 277 located between the bearings 150 and 152 and the primary seal assemblies 192 and 194. In particular, barrier fluid is injected through the bearings 150 and 152 and into the leakage collection areas 277, where it can collect any material that might leak past the primary seal assemblies from the material transfer interface 190. As stated relative to the first preferred embodiment, the barrier fluid used in the rotating union 102 can be made from any of a variety of materials.

The axial passage 272 is a barrier fluid return passage that extends between the axial port 114 formed at the face end 118 of the body 104, which acts as a barrier fluid outlet port, and a pair of radially-oriented barrier fluid return ports 278 and 279 (return ports). Collectively, these components provide a barrier fluid return path within the rotating union 102. More specifically, each of the return ports 278 and 279 communicates with the leakage collection areas 277. The return port 278 receives barrier fluid that passes through the bearing 150 and enters the left-hand leakage collection area 277 between the bearing 150 and the primary seal assembly 192. The return port 279 receives barrier fluid that passes through the beating 152 and enters the right-hand leakage collection area 277 between the bearing 152 and the primary seal assembly 194. The axial passage 272 carries barrier fluid removed from the leakage collection areas 277 to the axial port 114.

As can be seen in FIG. 5, the barrier fluid injection ports 274 and 276 inject barrier fluid so that it flows axially through the bearings 150 and 152. An alternative to this approach would be to inject the barrier fluid through holes in the outer bearing races such that the barrier fluid enters the bearings radially and exits axially. In either case, the flow of barrier fluid through the bearings works to isolate the bearings 150 and 152 from contact with any material that leaks past the dynamic seal assemblies 192 and 194. The barrier fluid works to flush out such material and remove it from the leakage collection areas 277 before it contacts the bearings 150 and 152.

Figure 9:
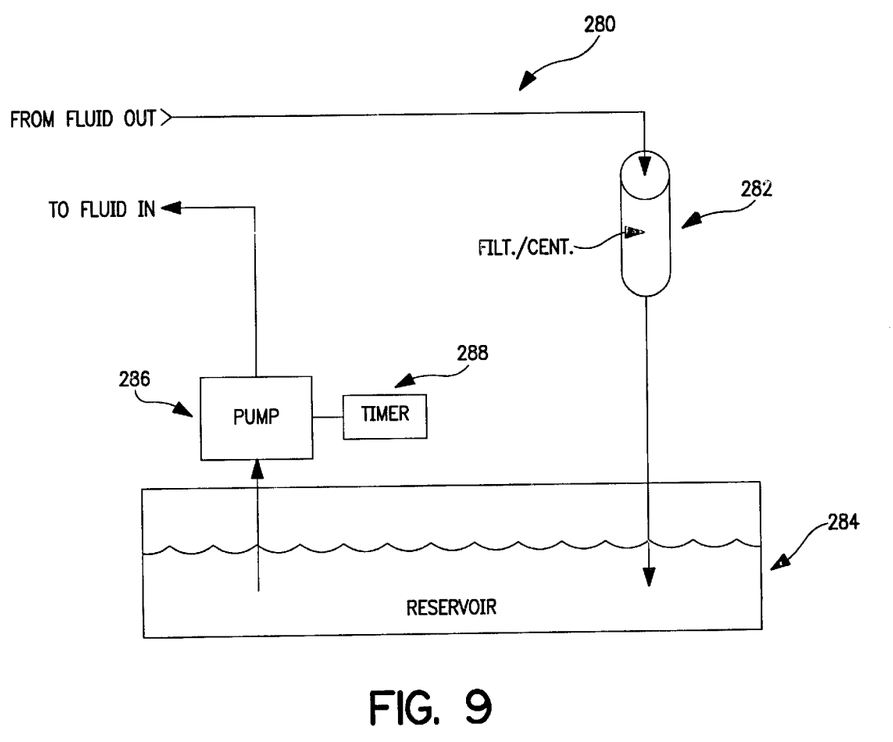
FIG. 9 is a diagrammatic view showing a barrier fluid recirculation and filtering or centrifuge system in accordance with the present invention.

Turning now to FIG. 9, an active (positive) barrier fluid recirculation system 280 is connected to the axial ports 112 and 114. The recirculation system 280 recovers the barrier fluid after it has circulated through the rotating union 102, including the axial passage 270, the injection ports 274 and 276, the bearings 150 and 152, the leakage collection areas 277, the return ports 278 and 279, and the axial passage 272. The barrier fluid received from the axial port 114 is first passed through a filter or centrifuge 282 to remove any material that may have leaked past the dynamic seal assemblies 192 and 194 and been picked up by the barrier fluid in the leakage collection areas 277. The filtered barrier fluid then passes to a barrier fluid collection reservoir 284. A pump 286 sends barrier fluid from the reservoir 284 back to the axial port 112. Because it has been found that the barrier fluid need not necessarily circulate through the rotating union 102 on a continuous basis to be effective, a timer 288 is provided to activate the pump 286 at selected time intervals, following which the pump 286 is deactivated.

Accordingly, an improved rotary union for abrasive, bearing damaging, or other material has been shown and described. Although various embodiments have been disclosed, it should be apparent that many variations and alternative embodiments would be apparent to those skilled in the art in view of the teachings herein. For example, the second preferred embodiment of the invention could be modified by adding a barrier fluid injection port that injects barrier fluid into the material transfer interface 190. This barrier fluid could be placed under a slightly positive differential pressure relative to the remainder of the barrier fluid system line pressure. The barrier fluid injected into the material transfer interface would tend to flow slowly across the primary seal assemblies 192 and 194 if leaks were present. This would clean and cool the dynamic seal faces 240 and 242 so as to reduce wear. It is understood, therefore, that the invention is not to be in any way limited except in accordance with the spirit of the appended claims and their equivalents.

I claim:

1. A rotating union for transferring a material stream from a material provider to a material recipient arranged for mutual relative rotation, comprising:

a generally cylindrical body;

a generally annular sleeve arranged to surround said body over a portion of said body's axial length;

first and second bearings located between said body and said sleeve, said bearings being axially spaced from each other;

a material stream passage extending in said body (body passage) a material stream passage extending in said sleeve (sleeve passage);

a dynamically sealed material transfer interface extending between said body passage and said sleeve passage;

a leakage collection area located to receive material that leaks out of said material transfer interface;

a barrier fluid contained in said leakage collection area, said barrier fluid being selected to carry material that leaks out of said material transfer interface into said leakage collection area; and a barrier fluid circulation system for removing said barrier fluid carrying said material from said leakage collection area, and continuously returning clean barrier fluid to said rotating union as it is in operation to prevent said material from contacting said bearings.

2. A rotating union as set forth in claim 1 wherein said material transfer interface is sealed by a single dynamic seal.

3. A rotating union as set forth in claim 2 wherein said dynamic seal includes a chair seal member secured to said sleeve and an opposing seal member formed on or attached to said body member.

4. A rotating union as set forth in claim 1 wherein said material transfer interface is sealed by a pair of dynamic seals.

5. A rotating union as set forth in claim 4 wherein said dynamic seals each include a chair seal member secured to said sleeve and a body ring goal member formed on or attached to said body.

6. A rotating union as set forth in claim 1 wherein said material transfer interface is sealed by at least one dynamic seal that includes a spring-biased, axially-slidable chair seal member and an axially-fixed body ring seal member that rotatably engages the chair seal member.

7. A rotating union as set forth in claim 6 wherein said seal members include opposing seal faces made from a hard, finely lapped material.

8. A rotating union as set forth in claim 7 wherein said slidable chair seal member is spring biased using a washer type spring.

9. A rotating union as set forth in claim 7 wherein said slidable chair seal member is spring biased by a plurality of axially-extending, circumferentially arranged coil springs extending between said slidable chair seal member and an annular shoulder formed on said sleeve.

10. A rotating union as set forth in claim 6 wherein said slidable seal chair seal member is rotatably connected to said sleeve using at least one pin extending between said slidable seal member and said chair seal member.

11. A rotating union as set forth in claim 6 wherein said fixed body ring seal member is axially secured on said body using a snap ring disposed around the circumference of said body in a slot, and rotatably connected to said body using a pair of U-shaped pins having a base disposed in a well formed in said body underneath said snap ring and at least one leg disposed in a notch formed in said fixed body ring seal member.

12. A rotating union as set forth in claim 1 wherein said leakage collection area includes an annular space formed between said sleeve and said body.

13. A rotating union as set forth in claim 1 wherein said barrier fluid circulation system is a passive system that includes a reservoir in fluid communication with said leakage collection area.

14. A rotating union as set forth in claim 13 wherein said reservoir is a cup mounted to surround said sleeve in coaxial relationship therewith.

15. A rotating union as set forth in claim 13 wherein said reservoir communicates with said leakage collection area via at least one radially extending port.

16. A rotating union as set forth in claim 15 wherein said barrier fluid circulation system includes an impeller positioned to impel barrier fluid containing leaked material through said port from said leakage collection area to said reservoir.

17. A rotating union as set forth in claim 1 wherein said barrier fluid circulation system is an active system that includes barrier fluid transfer passages formed in said body.

18. A rotating union as set forth in claim 17 wherein said barrier fluid circulation system further includes a pump for pumping said barrier fluid through said barrier fluid transfer passages.

19. A rotating union for transferring a material stream from a material provider to a material recipient arranged for mutual relative rotation, comprising:
   a generally cylindrical body;
   a generally annular sleeve arranged to surround said body over a portion of said body's axial length;
   first and second bearings providing a rotational interconnection between said body and said sleeve, said bearings being axially spaced from each other;
   a dynamically sealed material transfer interface extending between said body and said sleeve;
   a material stream passage extending in said body (body passage) between said material transfer interface and a body port located on said body;
   a material stream passage extending in said sleeve (sleeve passage) between said material transfer interface and a sleeve port located on said sleeve;
   a generally annular leakage collection area disposed between said body and said sleeve and located to receive material that leaks out of said material transfer interface;
   a barrier fluid reservoir cup mounted on said sleeve in coaxial relationship therewith;
   a barrier fluid contained in said cup;
   a pair of radially extending barrier fluid transfer passages extending through said sleeve from said cup to said leakage collection area, and
   said body being adapted to rotate relative to said sleeve and said barrier fluid transfer passages being arranged and configured such that barrier fluid carrying material in said leakage collection area is urged through a first one of said barrier fluid transfer passages to said cup while clean barrier fluid that does not carry said material is allowed to return from said cup to said leakage collection area to prevent said material from contacting said bearings.

20. A rotating union for transferring a material stream from a material provider to a material recipient arranged for mutual relative rotation, comprising:
   a generally cylindrical body;
   a generally annular sleeve arranged to surround said body over a portion of said body's axial length;
   first and second bearings providing a rotational interconnection between said body and said sleeve, said bearings being axially spaced from each other;
   a dynamically sealed material transfer interface extending between said body and said sleeve;
   a material stream passage extending in said body (body passage) between said material transfer interface and a body port located on said body;
   a material stream passage extending in said sleeve (sleeve passage) between said material transfer interface and a sleeve port located on said sleeve;
   a pair of generally annular leakage collection areas disposed between said body and said sleeve and located to receive material that leaks out of said material transfer interface toward said bearings;
   a barrier fluid supply passage extending in said body or said sleeve between a barrier fluid inlet port and a pair of barrier fluid injection port positioned for injecting a barrier fluid through said bearings and into said leakage collection areas;
   a barrier fluid return passage extending in said body or said sleeve between a pair of barrier fluid return ports positioned to receive said barrier fluid after it has passed through said bearings into said leakage collection areas and a barrier fluid outlet port;
   a barrier fluid recirculation system connected to said barrier fluid inlet port and said barrier fluid outlet port for recirculating a barrier fluid through said rotating union to prevent said material from contacting said bearings;
   said body port and said sleeve port being respectively adapted for connection to said material provider and said material recipient, or visa versa;
   said material transfer interface being configured to transfer a material stream, at least in part, in a radial direction;
   said material transfer interface including a pair of axially-spaced dynamic seals located between said bearings; and
   said barrier fluid return ports being located between said dynamic seals and said bearings.

* * * * *